Figure 1:
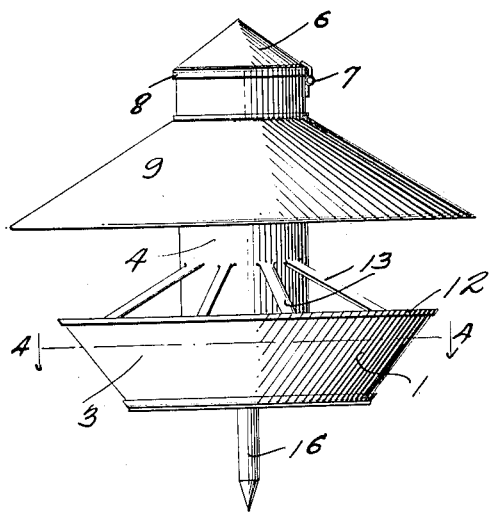

F. HOFFMAN.
FEED HOPPER.
APPLICATION FILED FEB. 12, 1918.

1,286,002.

Patented Nov. 26, 1918.

WITNESSES

INVENTOR
Frederick Hoffman

BY

ATTORNEY

UNITED STATES PATENT OFFICE.

FREDERICK HOFFMAN, OF SCHENECTADY, NEW YORK.

FEED-HOPPER.

1,286,002.  Specification of Letters Patent.  Patented Nov. 26, 1918.

Application filed February 12, 1918. Serial No. 216,774.

*To all whom it may concern:*

Be it known that I, FREDERICK HOFFMAN, a citizen of the United States, residing at Schenectady, in the county of Schenectady and State of New York, have invented certain new and useful Improvements in Feed-Hoppers, of which the following is a specification.

This invention relates to feed hoppers, and more particularly to a hopper intended especially for feeding poultry.

One of the main objects of the invention is to provide a hopper of simple construction and which may be produced at small cost. A further object is to provide a hopper so constructed as to prevent the entry of dirt, grit and other foreign material into the pan and which will protect the feed or grain from wind and rain so constructed as to readily shed moisture. Another object is to provide a hopper so arranged that roosting of the poultry on the hopper will be prevented. A further object is to provide a hopper in which the feed will be automatically supplied to the feed receptacle, this receptacle being braced so as to be supported in concentric relation to the feed or grain container or reservoir, the bracing means also serving the feed receptacle while permitting the fowl to obtain the feed or grain therefrom. Further objects will appear from the detailed description.

Figure 2:
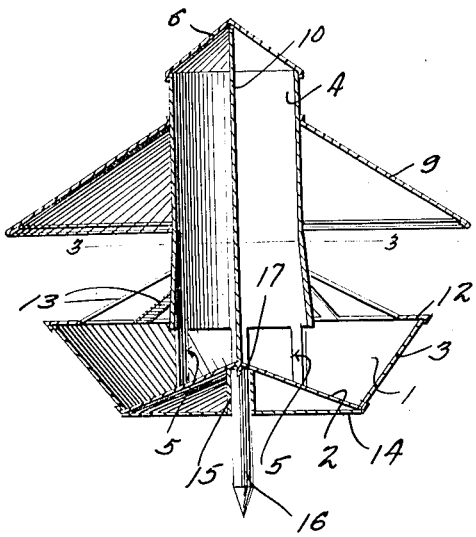
Figure 3:
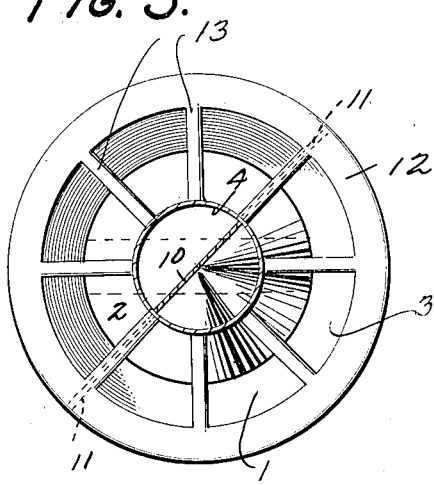
Figure 4:
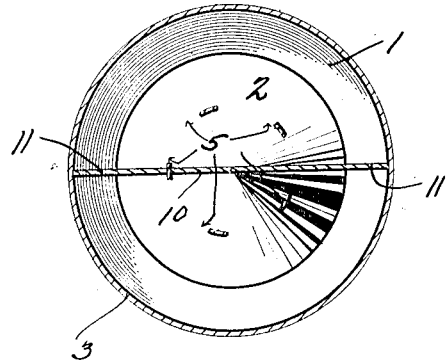

In the drawings:

Figure 1 is a side view of a feed hopper constructed in accordance with my invention, Fig. 2 is a central vertical section, Fig. 3 is a section taken substantially on line 3—3 of Fig. 2, Fig. 4 is a section taken on line 4—4 of Fig. 1.

The grain pan or receiver 1 is formed of sheet metal and is of inverted frusto-conical shape. This pan is provided with a conical bottom 2. The apex of this bottom is positioned at the center of pan 1, and the bottom is directed upwardly. This conical bottom serves to cause the grain or feed to flow outwardly toward the outwardly flaring peripheral wall 3 of the pan 1. The feed container or can 4 is secured at the center of bottom 2 in concentric relation with the wall 3 of the pan. As will be noted more clearly from Fig. 2 of the drawings, this can flares slightly downwardly. Can 4 is provided, at its lower end, with a plurality of openings 5 which serve to permit the grain to flow from the can into pan 1, this grain being directed toward the peripheral wall 3 of this pan by the conical bottom 2, as above noted. The upper end of can 4 is closed by a conical cover 6 secured thereto by a hinge 7 which serves to permit the cover to be readily raised for pouring grain or feed into the pan. The cover 6 is provided with a peripheral depending flange 8 which fits snugly about the can 4 when the cover is in lowered position. This cover, due to its conical shape and flange 8 which fits about the can, serves to prevent entry of moisture into the can thus protecting the contents thereof. A frusto-conical sheet metal hood 9 is secured about the container or can 4 a short distance below the cover 6. This hood is of greater diameter than the upper end of the pan 1 and serves to direct moisture which flows from the cover 6 beyond the feed pan, thus protecting the feed contained thereby.

The can 4 is provided with a central partition 10. This partition extends from the top to the bottom of the can having its upper end portion beveled from each side toward the center so as to fit snugly the interior of cover 6. By this means, the feed pan or container is divided in two compartments thus permitting two different kinds of feed to be placed therein. Within the pan 1, and intermediate the peripheral wall 3 thereof and the can 4, I provide two partition plates 11. These plates are disposed in alinement diametrically of the pan 4 and also are in alinement with the partition member 10. These plates 11 serve to divide the pan 1 into two separate compartments, one of these compartments receiving the feed from the compartment at one side of partition 10 and the other compartment receiving the other feed from the other side of the partition. By this arrangement, the hopper is well adapted for supplying two different kinds of feed to the poultry.

An annular cover plate 12 is secured to the upper edge of the peripheral wall 3 of the grain pan 1 and projects a short distance inwardly thereof. This plate is provided with a plurality of integral radial brace bars 13. The inner ends of these bars are secured to the feed can 4, and act as spacing and bracing members for the feed pan and the can. These bars also provide guard members which effectually prevent entry of the poultry into the pan while permitting easy access to the feed contained therein. As above noted, the cover 6 and hood 9 due to their particular shape and relation serve to prevent injury to feed within the pan 1 by moisture. Also, the cover and hood, due to their downward inclination and smooth contours, serve to effectually prevent roosting of the poultry on the hopper. The hood 9 is positioned relatively close to the feed pan 1 and provides a wind shield therefor, so as to prevent wastage by blowing of the grain. In addition, the brace bars 13 serve as guards to prevent the poultry from getting into the pan and scratching the grain out of the same.

A cross bar 14 is secured to the bottom of pan 1 and extends diametrically thereof. This bar is provided at its longitudinal center with an upwardly directed sleeve 15 secured therein, the upper end of this sleeve being in contact with the bottom 2. Sleeve 15 snugly receives the upper end portion of a securing peg 16. This peg is adapted to be driven into the ground, or secured in any other suitable manner, and is provided in its upper end with a diametrical groove which snugly receives a short rib 17 projecting downwardly from the apex of the bottom 2. By securing the peg 16 tightly in the ground and then placing the hopper thereon with rib 17 in the upper end of the peg, the feeder may be secured in position a short distance above the ground so as to insure that the poultry will not scratch foreign material into the pan 1, while being held in such position as to permit the poultry to easily reach the feed within the pan. The rib 17 serves to prevent rotary movement of the feeder upon the peg, thus insuring that the feeder will be maintained in proper position.

It will be evident that there may be slight changes made in the construction and arrangement of different parts of my invention without departing from the field and scope of the same and I intend to include all such variations in this application, as fall within the scope of the appended claim, in which a preferred form only of my invention is disclosed.

What I claim is:

In a feeder, a pan, a container secured in said pan and communicating at its lower end with the pan, the bottom of said pan being of conical shape, a bracing bar secured across the bottom of the pan diametrically thereof, and a sleeve member secured to the bottom of the pan at the apex thereof and to the bracing bar so as to be firmly held between said bar and the pan, said sleeve being adapted to receive the upper portion of a supporting peg so as to support the feeder, and a depending rib secured to the under face of the bottom of the pan at the apex thereof and adapted to fit into a slot in the upper end of the peg so as to prevent rotary movement of the feeder.

In testimony whereof I affix my signature in presence of two witnesses.

FREDERICK HOFFMAN.

Witnesses:
HORACE W. RAYMOND,
HANFORD ROBISON.